No. 647,111. Patented Apr. 10, 1900.
J. B. PARADIS.
FUNNEL.
(Application filed Dec. 12, 1899.)
(No Model.)
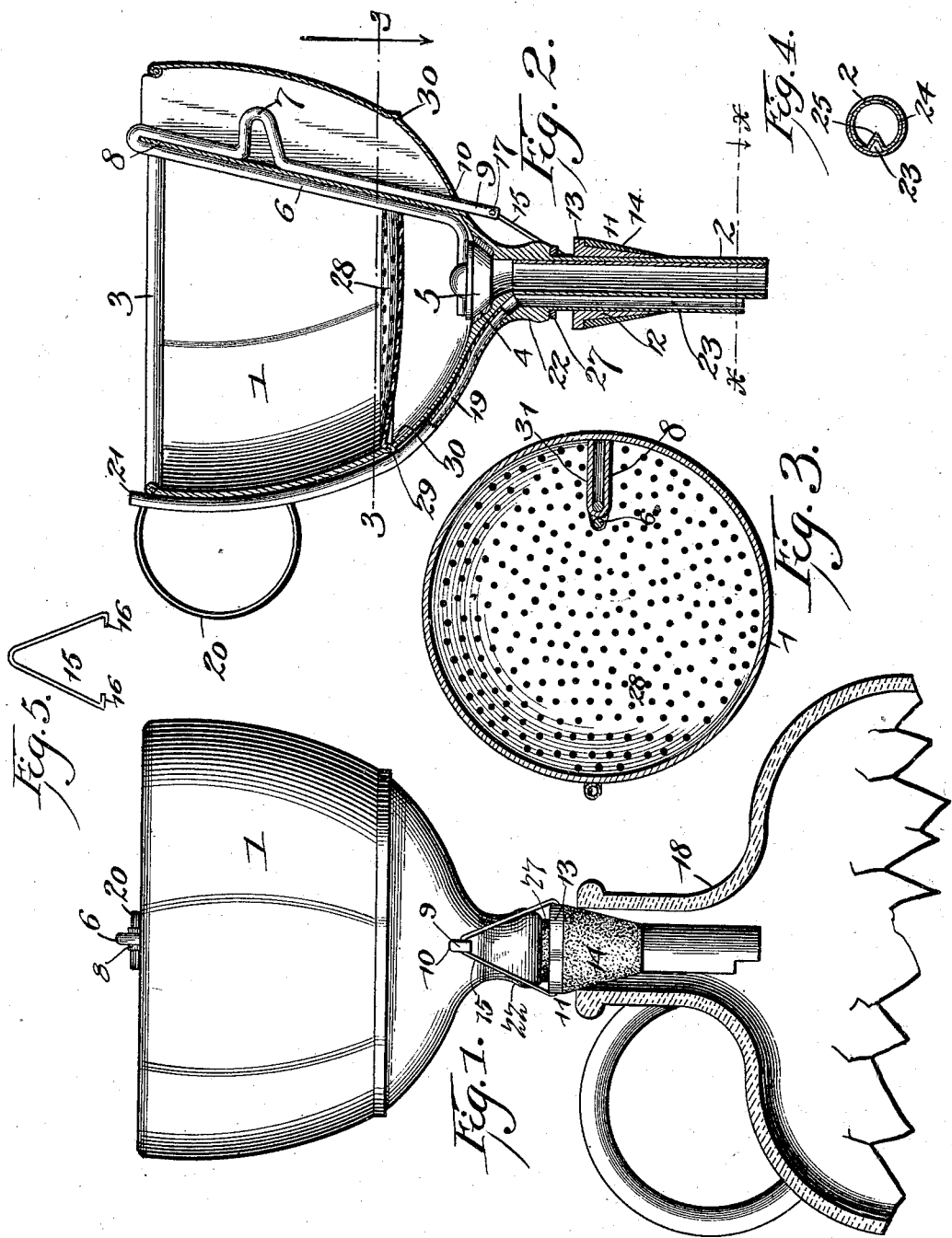
Witnesses
J. B. Paradis, Inventor,
By his Attorneys,
C. A. Snow & Co.

UNITED STATES PATENT OFFICE.

JOHN B. PARADIS, OF BIDDEFORD, MAINE.

FUNNEL.

SPECIFICATION forming part of Letters Patent No. 647,111, dated April 10, 1900.

Application filed December 12, 1899. Serial No. 740,072. (No model.)

*To all whom it may concern:*

Be it known that I, JOHN B. PARADIS, a citizen of the United States, residing at Biddeford, in the county of York and State of Maine, have invented a new and useful Funnel, of which the following is a specification.

This invention relates to valved funnels, and has for one object to provide improved means for actuating the valve when the spout of the funnel is placed in the mouth of a vessel to be filled and also to provide improved means for guiding the valve and preventing displacement thereof.

A further object is to provide an improved air-escape passage which will facilitate the escape of the displaced air from the vessel being filled and which will also prevent the liquid from being carried upward through the escape-passage and splashed upward around the spout.

It is a well-known fact that the centrifugal current of the liquid which is being poured into the conical bowl of a funnel greatly retards the passage of the liquid through the spout and often causes part of the liquid to be thrown upward and over the top of the bowl. In view of this disadvantage the present invention is provided with means for preventing this centrifugal current of the liquid, thereby preventing waste of the latter and also facilitating the filling of the vessel.

To these ends the present invention consists in the combination and arrangement of parts, as will be hereinafter more fully described, shown in the accompanying drawings, and particularly pointed out in the appended claims, it being understood that changes in the form, proportion, size, and the minor details of construction may be made within the scope of the appended claims without departing from the spirit or sacrificing any of the advantages of the present invention.

In the drawings, Figure 1 is a side elevation of the improved funnel, showing the same applied to a jug or vessel. Fig. 2 is a longitudinal sectional view of the funnel, taken in the plane of the guiding-arm of the valve. Fig. 3 is a horizontal sectional view taken through the body of the funnel and on the line 3 3 of Fig. 2. Fig. 4 is a horizontal sectional view taken through the spout or neck of the funnel on the line $x\ x$ of Fig. 2. Fig. 5 is a detail elevation of the link forming an operative connection for the valve.

Corresponding parts in the several figures of the drawings are designated by like characters of reference.

Referring to the accompanying drawings, 1 designates the usual conical bowl or body of the funnel, which has an enlarged base 22, to which is connected the tubular spout 2, which communicates through said base and with the interior of the bowl.

The opening in the bottom of the funnel is provided with beveled and convergent walls, forming a valve-seat 4, which is adapted to receive a valve 5, controlling the passage of the liquid through said opening. This valve is provided with an operating and guiding rod 6, which is bent intermediate of its ends into opposite substantially-parallel arms, one of the latter being provided with a lateral offset bend 7, which is adapted to form a guide-shoulder for the rod in the inclined vertical movement thereof. Provided in the bowl of the funnel, connected to one side thereof and extending from the bottom to a point slightly above the top of the bowl, is a casing or housing 8 of substantially U shape in cross-section and adapted to slidably receive the offset bend or shoulder 7 and the contiguous arm of the guiding and operating rod 6. This arrangement and mounting of the operating-rod is best shown in Fig. 2, and it will be noted that the arms of the rod embrace the outer wall of the casing or housing 8, and the guide-shoulder 7 is loosely inclosed within said housing, so as to permit of a free upward and downward movement of the arms with the minimum amount of friction. This shoulder also prevents the valve from swinging out of place when it is being lifted up and guides the valve back to its seat, so as to provide for a positive closing of the liquid-exit opening. The free end 9 of the guide-arm of the operating-rod passes loosely through an opening 10, provided in the bowl 1 at the lower end of the housing or casing 8.

To automatically operate the valve 5, there is provided a stopper 11, slidably mounted upon the spout or neck 2 and connected to the lower end 9 of the operating-rod 6. By reference to Fig. 2 it will be seen that the stopper comprises a substantially-conical sleeve 12, which is provided with an outer annular shoulder 13, located at the upper end of the sleeve, and a conical soft-rubber casing or cover 14 is fitted to the exterior of the sleeve and against the lower side of the annular shoulder 13. The stopper is connected to the operating-rod 6 by means of a substantially triangular-shaped bail 15, which is preferably formed from a single length of wire bent intermediate of its ends and having the latter bent inward to form fingers 16, which are adapted to be sprung into substantially diametrically-opposite openings formed in the peripheral edge of the annular shoulder 13 of the sleeve 12. It will be understood that the bail 15 is first passed through an opening 17, formed in the lower free end 9 of the operating-rod 6, so that the apex of the triangular bail may register with the opening 17 and the sides of the bail may depend from opposite sides of said rod.

In the operation of the automatic valve the stopper 11 is adapted to be moved upward by contact with the walls of the mouth of a jug or other vessel 18, as indicated in Fig. 1, whereby the rod 6 will also be elevated through the bail connection 15, and the valve 5 will be lifted from its seat, whereby the opening from the interior of the bowl 1 to the tubular spout or neck 2 is unobstructed, and the liquid may pass freely therethrough into the interior of the vessel being filled. The purpose of the soft-rubber casing or cover 14 is to provide a positive closing of the mouth of the vessel, so that the air contained therein may not escape around the exterior of the funnel neck or spout for an additional purpose, which will be hereinafter more fully explained.

To provide for the escape of the air contained within the vessel being filled, there is provided an escape-passage 19, connected to the exterior of the bowl 1 and located adjacent to the usual handle 20, the upper open end 21 of said passage projecting above the handle and adapted to be closed by the thumb of the operator. The lower end of the escape-passage 19 extends into the base 22 of the bowl 1 and communicates with the upper end of an air-passage 23, located interiorly of the tubular spout 2. This passage 23 is preferably of substantially-triangular shape, as best illustrated in Fig. 4, and is formed by means of a thin metal tube 24, fitted snugly within the stem 2 and having a substantially V-shaped longitudinal depression 25 formed in one side of said tube, the groove produced thereby being closed by the adjacent inner side of the tubular stem. As shown in Fig. 2, it will be seen that one side of the tubular spout is cut away, as at 26, at the lower end thereof, whereby the lower end of the passage 23 is open or exposed for a suitable distance above the lower end of the spout, thereby permitting of the free entrance into the air-passage 23 of the air displaced from the vessel by the liquid which is being poured therein. Furthermore, it will be understood that by cutting away the tubular spout a lateral entrance is formed leading into the escape-passage 23 and located above the discharge end of the spout, whereby the discharge of the liquid through the tubular spout does not interfere with the escape of the displaced air through the escape-passage.

When it is desired to stop the inflow of the liquid from the bowl 1 into the vessel 18, it is simply necessary to raise the funnel, whereby the stopper 12 will drop by reason of its weight, and thereby close the valve-passage 4, thus shutting off the supply of the liquid and permitting of the entire removal of the funnel without spilling or losing any of the contents thereof. If it is not desirable to remove the funnel, the flow of the liquid may be checked or stopped by placing the thumb or a finger over the open upper end 21 of the air-tube 19, whereby the air from the interior of the vessel 18 is prevented from escaping therefrom, and as the soft-rubber covering of the stopper 11 effectively closes the mouth of the vessel there is no avenue of escape for the air, and thereby the liquid will be prevented from entering the vessel, as will be understood. To prevent any possible escape of the air through the bore of the sleeve 12, there is provided a suitable washer or packing-ring 27, encircling the spout or neck 2 and fitted against the lower side of the base of the bowl, whereby the upper end of the stopper is adapted to engage against said washer, as indicated in Fig. 1.

In order that the liquid contents of the funnel may be strained, there is provided a perforated disk 28, having a pendent peripheral flange 29, which is adapted to rest upon an inner annular shoulder 30, provided within the bowl of the funnel. At one side of the strainer there is provided a diametric slot 31, adapted to receive the housing or casing 8, and thereby prevent movement of the strainer.

The housing or casing 8 provides a wall or partition which is located in the path of the centrifugal current of the liquid which is being poured into the bowl of the funnel and acts to break up said current, and thereby prevents the liquid from being thrown upward and over the top of the bowl. Furthermore, the upper edge of the bowl is provided with an inner annular bead 3, which forms a shoulder to prevent the liquid from slipping over the upper edge of the bowl when the liquid is first poured into the funnel.

It is not essential that the handle 20 be located diametrically opposite the housing or partition 8, as shown in the drawings; but it is essential that the upper open end of the air-passage 19 be located adjacent to the handle, so that said air-passage may be readily closed by the hand which holds the handle.

What I claim is—

1. In a funnel, the combination with the bowl and tubular spout thereof, of a valve controlling the passage from the bowl to the spout, an operating and guide rod connected to the valve and having its free end projecting through an opening formed in one side of the bowl, a stopper slidable upon the tubular spout, and a substantially-triangular bail having its apex connected to the free projecting end of the operating-rod, and its opposite ends provided with fingers adapted to be sprung into engagement with slidable stopper, substantially as and for the purpose described.

2. The combination with a funnel having a casing or housing provided interiorly of the bowl thereof, of a valve controlling the passage between the bowl and the tubular spout of the funnel, an operating-rod connected to the valve and having a guide-shoulder slidably received within the housing or casing, a stopper slidable upon the spout of the funnel, and an operative connection between the stopper and the operating-rod, substantially as and for the purpose set forth.

3. The combination with a funnel having an upright housing or casing open at its upper end and located interiorly of the bowl of the funnel, of a valve controlling the passage from the bowl to the tubular spout thereof, a guide and operating rod connected at one end to the valve and bent intermediate of its ends to form opposite substantially-parallel arms, one of said arms being slidably received within the housing or casing and provided with a lateral offset bent portion forming a guide-shoulder, a stopper slidable upon the spout of the funnel, and an operative connection between the stopper and the operating-rod, substantially as and for the purpose set forth.

4. The combination with a funnel, of a valve controlling the passage from the bowl to the spout of the funnel, a stopper slidable upon the spout, an operative connection between the stopper and the valve, a washer or packing-ring encircling the spout of the funnel and fitting against the base of the bowl thereof, and an air-escape passage, substantially as and for the purpose set forth.

5. The combination with a funnel, of an air-escape passage, formed by a tube fitted snugly within the tubular spout of the funnel, and having a longitudinal depression closed throughout one side thereof by the adjacent inner side of the tubular spout, the lower end of the latter being cut away and forming a lateral entrance into the air-escape passage, substantially as shown and described.

6. A funnel, having a circular bowl, and a current-breaking partition or wall extending inwardly from one side of the funnel and terminating short of the opposite side thereof.

7. A funnel having a bowl, and a current-breaking partition extending inwardly from one side of the funnel and terminating short of the opposite side thereof.

8. A funnel having a bowl, a hollow current-breaking partition extending inwardly from one side of the funnel-bowl and terminating short of the opposite side, a valve for closing the outlet of the funnel, and a guide-rod for the valve, attached thereto and disposed slidably in the partition.

In testimony that I claim the foregoing as my own I have hereto affixed my signature in the presence of two witnesses.

JOHN B. PARADIS.

Witnesses:
JOSEPH E. ROGERS,
THOS. H. BEAULIEU.